Figure 1:
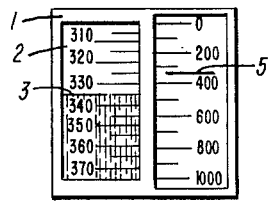

June 15, 1965        A. AST        3,189,111
OPTICAL INDICATOR BALANCE WITH FINE AND COARSE INDICATOR SCALES
Filed Jan. 18, 1963

INVENTOR
ADOLF AST

BY  Werner W. Kleeman

ATTORNEY 3,189,111
OPTICAL INDICATOR BALANCE WITH FINE AND COARSE INDICATOR SCALES
Adolf Ast, Messtetten, Germany, assignor to
August Sauter K.G., Ebingen, Germany
Filed Jan. 18, 1963, Ser. No. 252,390
Claims priority, application Germany, Jan. 26, 1962,
S 40,189
7 Claims. (Cl. 177—178)

The present invention relates to an improved optical indicator balance or weighing device provided with an optical device for segmental or sector-like sensitive or fine indication and with a device for simultaneous non-sensitive or coarse indication of the weight values. Balances or weighing machines of this type are especially useful for the packaging or filling of fluid and granular material, in order at times to read-out during filling the approximate weight.

The present invention has as one of its primary objects to provide for an extremely simple construction of the coarse indicator as is possible and as the case may be to combine such indicator with the fine indicator.

An essential feature of the present invention resides in the fact that, in addition to the optically controlled mechanism for the fine pointer or indicator, there is further provided a mechanically controlled indicator which is coordinated with a coarse scale which extends throughout the entire measuring range and which is arranged adjacent the illuminated or optically indicated fine scale. An important advantage of this constructional form resides in that, the necessary means for carrying out the nonsensitive or coarse indication are of the simplest type. Additionally, the coarse indicator is independent of the magnification factor of the optical system. Also, the projection scales for the fine indicator can be exchanged independently of the coarse indicator.

A number of different embodiments or modifications of the inventive device are possible. Thus, for example, the indicator can be connected to the measuring element and can be movably supported directly in front of the coarse scale. With such an arrangement the use of a coarse scale through which light shines is not necessary. A further preferred embodiment of the invention resides in the feature that the nonsensitive or coarse scale is arranged on the ground-glass plate of the projection system adjacent the section or field of the illuminated or optically indicated fine scale, whereby the indicator is connected to the measuring element, can be movably arranged behind the ground-glass plate in the path of rays of the projection system, and can indicate by means of its shadow the momentary measured value of the coarse scale. According to a further embodiment, the indicator can consist of a shield or light stop submerged in the path of rays of the projection system.

Accordingly, a further important object of the present invention is to provide an improved balance which is relatively simple in construction yet highly reliable in operation.

Another important object of the present invention is to provide an improved weighing mechanism of the type including an optically indicated fine scale and a mechanically controlled coarse scale.

Still a further important object of the present invention is the provision of an improved weighing device provided with an optical system for fine or sensitive indication and a device for simultaneous coarse or non-sensitive indication, and further wherein in addition to the optically controlled system for the fine scale there is provided a mechanically controlled indicator cooperable with a coarse scale extending over the entire measuring range and which is arranged adjacent the optically indicated fine scale.

These and still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 2:
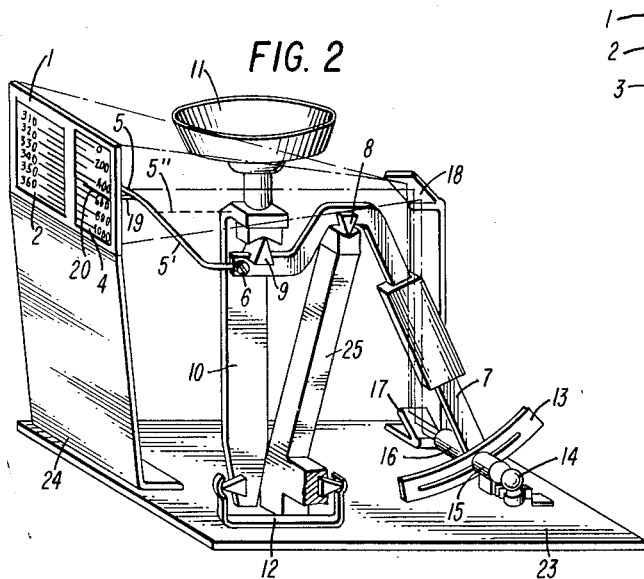
Figure 3:
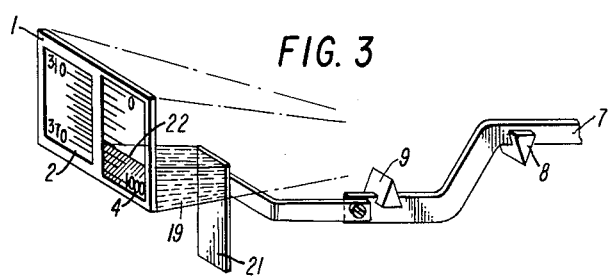
Figure 4:
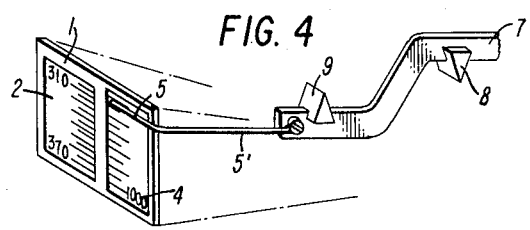

In the drawing:

FIGURE 1 diagrammatically illustrates a field with a section for the fine scale and provided with a coarse scale;

FIGURE 2 diagrammatically illustrates portions of the optical indicator balance necessary for understanding the teachings of the invention;

FIGURE 3 illustrates a portion of the device shown in FIGURE 2 in a somewhat modified constructional form; and FIGURE 4 illustrates a portion of the device of FIGURE 2 in a third constructional form.

Referring now to the drawing, the ground-glass plate 1, shown in front view in FIGURE 1, of an optical projection system possesses an enveloped or bordered portion 2 in which is viewable the representation or image of the weight scale for fine or sensitive recording or indication. The optically indicated or projected fine scale or image 2 consists of numbers and graduations. In the example illustrated in FIGURE 1 the optically indicated or projected fine scale 2 indicates a range of measurement from 310 to 370. The boundary edge 3 of a green color marker by way of example, thereby serves for reading-out the momentary depicted value, which in the present case has an indicated value of 335. The run-off direction of this optically indicated fine scale or projected image 2 is directed from the bottom towards the top for increasing measured values.

Adjacent and to the right of the section or field for the projected fine scale or image 2 the ground-glass plate 1 carries a section or field 4 provided with a non-sensitive or coarse scale which extends over the entire measuring range of the balance, in the present case from 0 to 1000. The numbers and graduations of the coarse scale 4 are fixedly applied to the ground-glass plate 1. An upwardly and downwardly movable pointer or indicator 5 permits an approximate or rough reading-out of a measured value. In the illustrated embodiment, an estimation to the first two decimal places is possible, that is, as shown to the value 330.

FIGURE 2 illustrates an optical indicator balance provided with a base plate 23 and a mounted or erected side wall 24 to which is connected the ground-glass plate 1. The housing which normally surrounds the balance has been omitted in order to render visible the individual parts of the balance. The pointer or indicator 5 is defined by the end of an appropriately bent rod 5' connected to the tiltable beam 7 of the balance through the intermediary of a screw 6 or the like. The beam 7 is pivotably mounted via a knife edge 8 on a support or holder 25 carried by the base plate 23. A carrier member 10 for the weighing bowl or receiver 11 rests on an end knife edge 9 of the beam 7. The carrier member 10 is parallelly guided by means of the schematically illustrated guide rod 12. At the lower end of the beam 7 there is connected the projection scale 13. This projection scale 13 is illuminated by an optical projection system which comprises a lamp 14, a condenser 15, and an objective 16. The scale picture or image is projected via mirrors 17 and 18 from the rear side onto the ground-glass plate 1. The projection surface is so constructed that the coarse scale 4 is also illuminated from behind, so that also the shadow 19 of the strip or line-shaped indicator 5 appears as a shadow line 20 on the coarse scale. In place of the rod 5′ connected to the beam 7, there could also be provided a rod 5″ which is connected at one end to the bowl carrier 10 and with its other end forms the pointer or indicator 5. Such a rod 5″ has been shown in FIGURE 1 in phantom or chain-dot lines.

In the embodiment according to FIGURE 3 the indicator 5 comprises a shield 21 which is connected to the forwardmost end of the beam 7, the shadow edge 22 of which permits a reading-out of the momentary measured value of the coarse scale 4. In the embodiment according to FIGURE 4 the rod 5′ possesses such a length that the indicator 5 appears in front of the field or section of the coarse scale 4. Such an embodiment can also be employed when the coarse scale cannot be passed or illuminated by light.

In all of the embodiments disclosed, the indicator 5 which acts or cooperates with the coarse scale 4 is mechanically controlled. It is of importance that the indicator 5 be connected to a measuring element, which can be the beam 7 or also the material-receiving bowl carrier 10.

Having thus described the present invention, what is desired to be secured by United States Letters Patent is:

1. An optical indicator balance comprising an optically projected fine scale, a movable projection scale, said optically projected fine scale being formed by a portion of said movable projection scale, a coarse scale extending throughout the entire range of measurement spacedly arranged from, yet in substantially a common plane with, said optically projected fine scale, said coarse scale being stationary, an optical system cooperating with said movable projection scale for producing said optical projected fine scale for sensitive optical indication of a measured value, and a mechanically controlled indicator cooperating with said coarse scale for coarse indication of a measured value.

2. A balance according to claim 1, said mechanically controlled indicator being movably mounted in front of said coarse scale.

3. A balance according to claim 1, including a measuring element, said mechanically controlled indicator being operatively connected to said measuring element and being movably mounted behind said coarse scale in the path of light rays emanating from said optical system to indicate via its shadow the momentary measured value on the coarse scale.

4. A balance according to claim 3; said mechanically controlled indicator being a shield which extends into said path of light rays, the shadow edge of which indicates the momentary measured value on said coarse scale.

5. A weighing device comprising, in combination, a receiving member for receiving material to be weighed, a carrier for supporting said receiving member, a rockable beam operable with said receiving member, an optically projected fine scale and a coarse scale, an optical system operatively associated with said rockable beam for providing a fine indication of a measured value via said optically projected fine scale which can be read-off the latter, a mechanically controlled indicator connected to said carrier and cooperating with said coarse scale to provide a coarse indication of a measured value which can be read-off said coarse scale.

6. An optical indicator balance comprising an optically projected fine scale, a coarse scale extending throughout the entire range of measurement arranged adjacent said optically projected fine scale, an optical system for producing said optical projected fine scale for sensitive optical indication of a measured value, a mechanically controlled indicator cooperating with said coarse scale for coarse indication of a measured value, a measuring element, said mechanically controlled indicator being operatively connected to said measuring element, said measuring element being a carrier member adapted to support a material-receiving bowl of said balance.

7. A weighing device comprising, in combination, a receiving member for receiving material to be weighed, a carrier for supporting said receiving member, a rockable beam operable with said receiving member, an optically projected fine scale and a coarse scale, an optical system operatively associated with said rockable beam for depicting a fine indication of a measured value via said optically projected fine scale which can be read-off the latter, a mechanically controlled indicator connected to said rockable beam and cooperating with said coarse scale to provide a coarse indication of a measured value which can be read-off said coarse scale.

References Cited by the Examiner

UNITED STATES PATENTS

| | | | |
|---|---|---|---|
| 2,343,621 | 3/44 | Williams | 177—178 |
| 2,582,517 | 1/52 | Williams | 177—178 |
| 3,026,768 | 3/62 | Appius | 88—24 |

FOREIGN PATENTS

| | | |
|---|---|---|
| 1,031,017 | 5/58 | Germany. |
| 1,046,894 | 12/58 | Germany. |
| 476,095 | 12/37 | Great Britain. |
| 865,034 | 4/61 | Great Britain. |

LEO SMILOW, *Primary Examiner.*